(12) United States Patent
Sundaresan

(10) Patent No.: US 6,931,397 B1
(45) Date of Patent: Aug. 16, 2005

(54) SYSTEM AND METHOD FOR AUTOMATIC GENERATION OF DYNAMIC SEARCH ABSTRACTS CONTAIN METADATA BY CRAWLER

(75) Inventor: Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 09/502,818

(22) Filed: Feb. 11, 2000

(51) Int. Cl.[7] .............................................. G06F 17/30
(52) U.S. Cl. .............. 707/5; 707/3; 707/10; 707/104.1; 715/501.1; 715/513
(58) Field of Search .................. 707/1–10, 100–104.1, 707/200–205, 501.1, 500.1, 512–513; 709/331–332, 709/312, 218–220, 200–203, 228–229; 705/26–27; 345/968; 715/501.1, 511, 513

(56) References Cited

U.S. PATENT DOCUMENTS

| | | | |
|---|---|---|---|
| 4,996,642 A | 2/1991 | Hey | 705/27 |
| 5,659,732 A | 8/1997 | Kirsch | 707/5 |
| 5,701,469 A | 12/1997 | Brandli et al. | 707/102 |
| 5,790,426 A | 8/1998 | Robinson | 702/179 |
| 5,864,863 A | 1/1999 | Burrows | 707/103 R |
| 5,875,446 A | 2/1999 | Brown et al. | 707/3 |
| 5,878,233 A | 3/1999 | Schloss | 709/225 |
| 5,884,282 A | 3/1999 | Robinson | 705/27 |
| 5,913,210 A * | 6/1999 | Call | 705/20 |
| 5,920,859 A * | 7/1999 | Li | 707/10 |
| 6,012,087 A * | 1/2000 | Freivald et al. | 709/201 |
| 6,078,866 A * | 6/2000 | Buck et al. | 702/2 |
| 6,078,914 A * | 6/2000 | Redfern | 707/2 |
| 6,094,649 A * | 7/2000 | Bowen et al. | 707/3 |
| 6,167,409 A * | 12/2000 | DeRose et al. | 707/10 |
| 6,226,630 B1 * | 5/2001 | Billmers | 345/968 |
| 6,263,332 B1 * | 7/2001 | Nasr et al. | 707/104.1 |
| 6,263,364 B1 * | 7/2001 | Najork et al. | 709/201 |

(Continued)

FOREIGN PATENT DOCUMENTS

| | | | | |
|---|---|---|---|---|
| EP | 1120717 A2 * | 8/2001 | | 17/30 |
| WO | WO 01/27712 A2 * | 4/2001 | | |

OTHER PUBLICATIONS

Exemplary search report produced on Jan. 19, 2000, using Alta Vista search engine.

*Primary Examiner*—Srirama Channavajjala
(74) *Attorney, Agent, or Firm*—Samuel A. Kassatly

(57) ABSTRACT

A computer program product is provided as an abstract update system that improves Internet searching by automatically generating accurate and dynamic search abstracts. The abstract update system enables search engines to provide the most recent abstract information for a document that matches a search query, even if this document may have been crawled after the metadata was indexed. The dynamic abstracts are generated from the latest crawl metadata and link information stored in a link repository. As a result, the dynamic abstracts contain metadata based primarily on changes to a candidate page itself, and changes to what other sources provide about this candidate page. For example, even if a candidate page has not changed, new pages may point to it; some pages that used to point to the candidate page no longer do so; or existing pages that point to the candidate page change their annotations.

22 Claims, 4 Drawing Sheets

U.S. PATENT DOCUMENTS 6,271,840 B1 * 8/2001 Finseth et al. .............. 707/513
6,304,864 B1 * 10/2001 Liddy et al. .................. 706/15
6,351,755 B1 * 2/2002 Najork et al. ............ 715/501.1
6,363,377 B1 * 3/2002 Kravets et al. ................ 707/4
6,633,867 B1 * 10/2003 Kraft et al. ................... 707/3
6,665,658 B1 * 12/2003 DaCosta et al. ............... 707/3

* cited by examiner

SYSTEM AND METHOD FOR AUTOMATIC GENERATION OF DYNAMIC SEARCH ABSTRACTS CONTAIN METADATA BY CRAWLER

CROSS-REFERENCE TO RELATED APPLICATION

This application is related to patent application Ser. No. 09/500,633, is now abandoned titled "Using Annotative Link Information to Produce Quality Abstracts in Search Engines", filed on Feb. 9, 2000, which is assigned to the same assignee as this application, and which is incorporated herein by reference in its entirety.

FIELD OF THE INVENTION

The present invention relates to the field of data processing, and particularly to a software system and associated method for use with a search engine, to search data maintained in systems that are linked together over an associated network such as the Internet. More specifically, this invention pertains to a computer software product for automatically generating accurate and dynamic search abstracts.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these pages by means of computer software programs commonly known as Internet browsers. Due to the vast number of WWW sites, many web pages have a redundancy of information or share a strong likeness in either function or title. The vastness of the unstructured WWW causes users to rely primarily on Internet search engines to retrieve information or to locate businesses. These search engines use various means to determine the relevance of a user-defined search to the information retrieved.

The authors of web pages provide information known as metadata, within the body of the hypertext markup language (HTML) document that defines the web pages. A computer software product known as a web crawler, systematically accesses web pages by sequentially following hypertext links from page to page. The crawler indexes the pages for use by the search engines using information about a web page as provided by its address or Universal Resource Locator (URL), metadata, and other criteria found within the page. The crawler is run periodically to update previously stored data and to append information about newly created web pages. The information compiled by the crawler is stored in a metadata repository or database. The search engines search this repository to identify matches for the user-defined search rather than attempt to find matches in real time.

A typical search engine has an interface with a search window where the user enters an alphanumeric search expression or keywords. The search engine sifts through available web sites for the user's search terms, and returns the search of results in the form of HTML pages. Each search result includes a list of individual entries that have been identified by the search engine as satisfying the user's search expression. Each entry or "hit" includes a hyperlink that points to a Uniform Resource Locator (URL) location or web page.

In addition to the hyperlink, certain search result pages include a short summary or abstract that describes the content of the URL location. Typically, search engines generate this abstract from the file at the URL, and only provide acceptable results for URLs that point to HTML format documents. For URLs that point to HTML documents or web pages, a typical abstract includes a combination of values selected from HTML tags. These values may include a text from the web page's "title" tag, from what are referred to as "annotations" or "meta tag values" such as "description," "keywords," etc., from "heading" tag values (e.g., Hl, H2 tags), or from some combination of the content of these tags.

However, for non-HTML type document, such as a post-script file or a word processing document that otherwise satisfies the search criteria, the search engines typically do not return a URL, but instead point to a directory or to an HTML page, which, in turn, refers to the non-HTML document. As a result, for a non-HTML document, the search results include links to, and descriptions of pages that point to this non-HTML document rather than containing a description of the non-HTML document itself.

Moreover, for one HTML parent page with links to multiple different relevant non-HTML documents that satisfy the user's search criteria, the search result may include multiple identical URLs, one for each relevant non-HTML document. Each of these identical URLs points to the same HTML parent page, and each may include an identical abstract that is descriptive of the parent HTML page. As a result, the search results in redundant abstracts that can be practically useless, distracting, and time consuming to review.

An additional challenge that dilutes the efficacy of searches includes the dynamic, i.e., continuously changing nature of the web pages and the pages they point to, and the inability of the crawlers to efficiently update the data and metadata contained in the web pages and in the pages pointing to them. The time lag between the generation of the metadata by the web crawlers and the update of the actual data in the web pages has heretofore presented an unsurmountable problem for the rendering of accurate abstracts. In a conventional search engine search, the results have been based on metadata in the search engine's repository rather than on up to date data recently published on the web.

Oftentimes users are presented with outdated search abstracts even though up to date information is already available on the web. As an example, an actual search conducted on Jan. 19, 2000 using the keyword "lawyer" and the Alta Vista search engine, revealed an abstract pointing to Martindale-Hubbel Lawyer Locator URL. The copyright notice in the abstract read "1996–1999". However, a visit to the Martindale-Hubbel Lawyer Locator URL showed a copyright notice that read "1996–2000", clearly indicating a disparity between the metadata in the search abstract and the data in the actual web site.

There is currently no adequate mechanism by which search engines automatically generate accurate and dynamic abstracts, and the need for such a mechanism has heretofore remained unsatisfied.

SUMMARY OF THE INVENTION

The search update system and associated method of the present invention satisfy this need. In accordance with one embodiment, the search update system is provided as a mechanism to improve Internet searching by automatically generating accurate and dynamic search abstracts.

The present abstract update system enables search engines to provide the most recent abstract information on a document that matches a search query, even if this document may have been crawled after the metadata was indexed. In one embodiment, this goal is achieved by generating the abstract from the latest crawl link information rather than from the metadata stored in a metadata repository. In another embodiment, this goal is achieved by generating the abstract in part from the latest crawl metadata and in part from the metadata stored in a link repository.

The updated abstract generated by the abstract update system may be significantly different from the abstract that would have otherwise been generated by traditional search engines from indexed metadata, and in most cases the user is presented with the most up to date abstract information. In a result page with multiple result entries, the present abstract update system enables the user to select and visit the hypertext URL page that corresponds to the result entry whose abstract seems closest to the user query.

In use, the web crawler crawls the web, and builds a metadata repository and a link repository. The crawler also keeps persistent information on the URLs and their crawl history in the link repository. An abstract engine (or producer) generates an abstract for each web document from the metadata stored in the metadata database. An indexing engine periodically indexes the metadata and makes the indexed data available to the search engine.

When a user enters a search query, the indexing engine, does not present abstracts based on the metadata stored in the metadata repository as is traditionally done, but rather inquires if the metadata repository or the link repository contains new information for each result entry in the result set. If new information exists, this new information is fed to the indexing engine so as to generate an updated or dynamic abstract, on a real time basis, for the result entry. This dynamic abstract will contain more up to date information than an abstract generated by traditional means.

The search dynamically generates an abstract for each entry in the search result and publishes it on the result page. If the user is not satisfied with the quality or content of a particular published abstract, the user disregards such abstract and proceeds to another result entry.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE INVENTION

Figure 1:
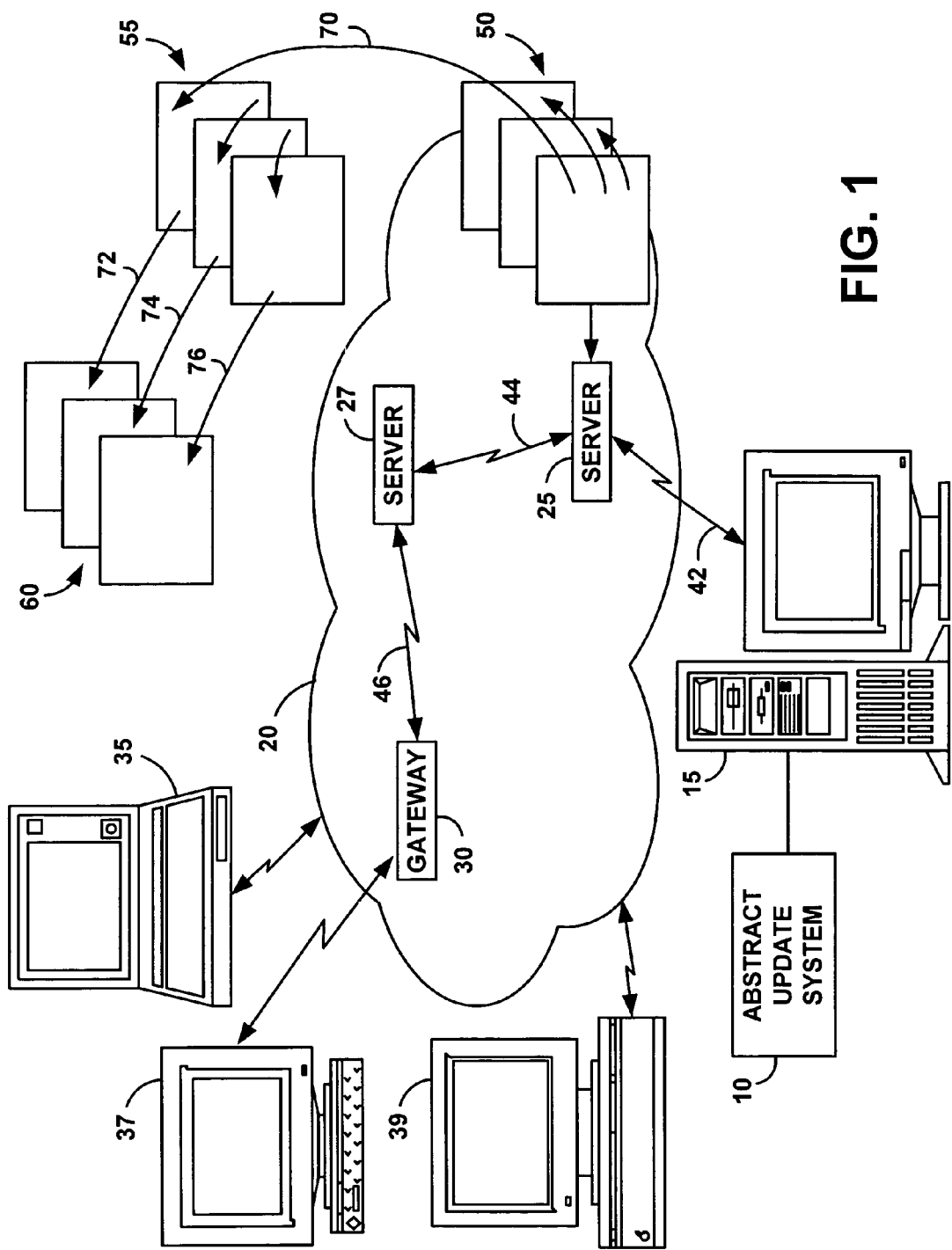
FIG. 1 is a schematic illustration of an exemplary operating environment in which an abstract update system of the present invention may be used.

The following definitions and explanations provide background information pertaining to the technical field of the present invention, and are intended to facilitate the understanding of the present invention without limiting its scope:

Crawler: A program that automatically explores the World Wide Web by retrieving a document and recursively retrieving some or all the documents that are linked to it.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

Internet: A collection of interconnected public and private computer networks that are linked together with routers by a set of standards protocols to form a global, distributed network.

Search engine: A remotely accessible World Wide Web tool that allows users to conduct keyword searches for information on the Internet.

Server: A software program or a computer that responds to requests from a web browser by returning ("serving") web documents.

URL (Uniform Resource Locator): A unique address that fully specifies the location of a content object on the Internet. The general format of a URL is protocol://server-address/path/filename.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client-server hypertext distributed information retrieval system.

Figure 2:
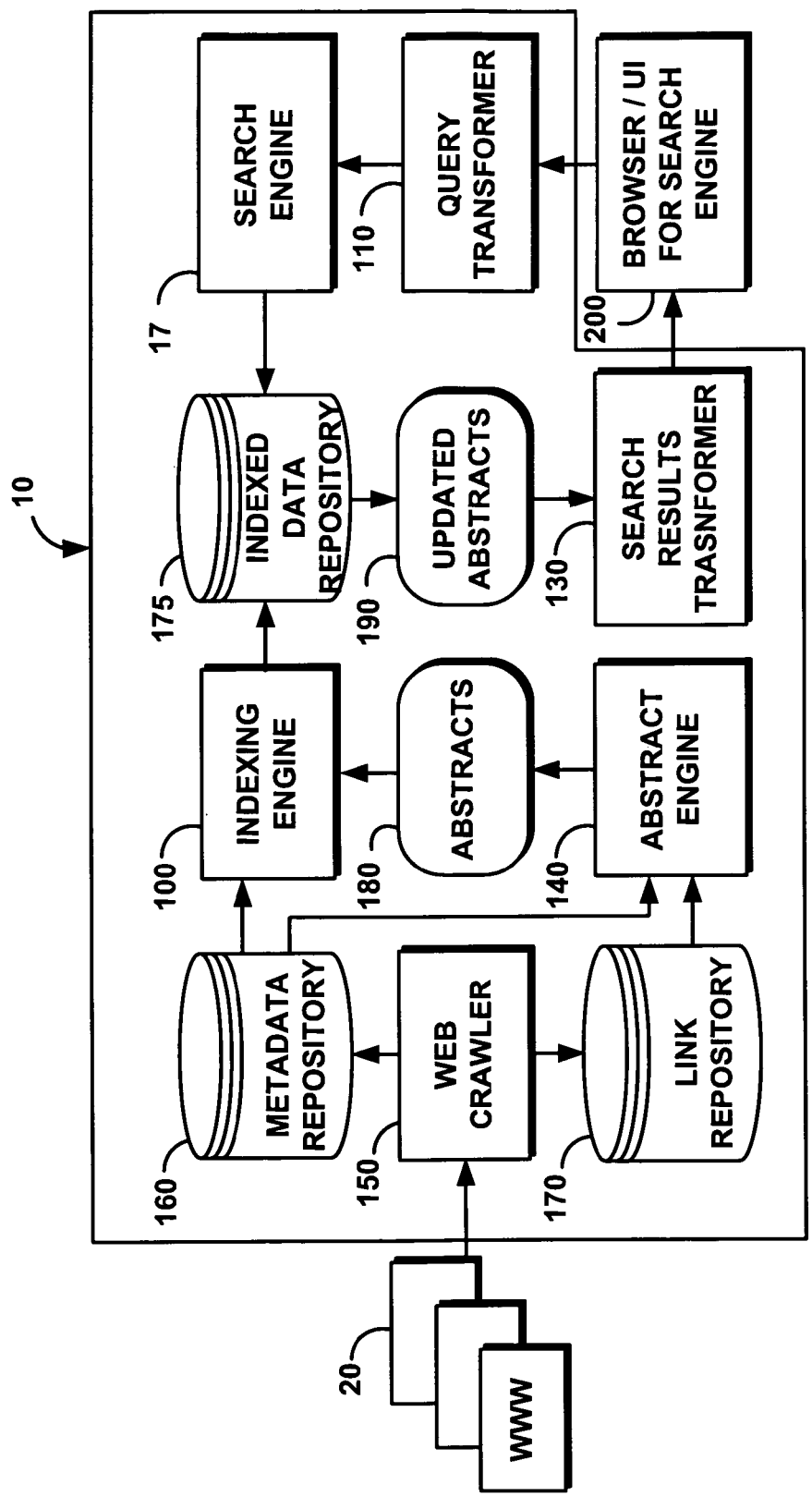
FIG. 2 is a high level block diagram of the abstract update system of FIG. 1.

FIG. 1 portrays the overall environment in which an abstract update system 10 according to the present invention may be used. The abstract update system 10 includes a software or computer program product which is typically embedded within, or installed on a host server 15. Alternatively, the abstract update system 10 can be saved on a suitable storage medium such as a diskette, a CD, a hard drive, or like devices. Although the abstract update system 10 is shown in FIG. 2 as integrating a search engine 17, it should be clear that the abstract update system 10 can be an independent module which is separate from the search engine 17. In addition, while the abstract update system 10 will be described in connection with the WWW, the abstract update system 10 can be used with a stand-alone database of terms that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 35, 37, 39, and can query the host server 15 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

The abstract update system 10 will now be described with further reference to FIG. 2. The abstract update system 10 includes a computer program product such as a software package, which is generally comprised of an on-line indexing engine 100, a query transformer 110, a search results transformer 130, an abstract engine 140, a web crawler 150, a metadata repository 160, and a link repository 170.

In use, the crawler 150 crawls the web 20 and downloads web documents to the metadata repository 160 where they are stored and updated systematically. The web documents are then indexed by the indexing engine 100 to build an indexed data repository 175. The indexed data are stored in the indexed data repository 175 for later use by the search engine 17, as appropriate.

The metadata repository 160 is a data store which is maintained by a web information gatherer such as the web crawler 150. The metadata repository 160 maintains information or metadata from previously encountered web pages, which metadata is used by the abstract engine 140 to prepare the abstracts 180.

The link repository 170 is a data store of persistent links such as a relational database, with persistent (i.e., permanent) link information, such as up to date URL metadata. As an example, the link repository 170 may include data that are indexed as: URL, parent page (i.e., the page that points to other pages), child page (i.e., the page being referred to by another page), annotations (i.e., information from and about the candidate pages), and the date(s) on which the parent page was visited.

Preferably, the link repository 170 is maintained centrally at the search service provider. Alternatively, the link repository 170 may be located and maintained on an independently provided system to which the search service provider has access. In addition, while the abstract update system 10 is described as including two repositories 160, 170, it should be clear these two repositories 160, 170 can be functionally combined in a single database.

The abstract engine (or producer) 140 generates an abstract 180 for each web document from the metadata stored in the metadata repository 160. While the abstract engine 140 is illustrated in FIG. 2 as being separate from the indexing engine 100, it should be clear that the abstract engine 140 be a part of the indexing engine 100.

In a preferred embodiment, the abstract engine 140 does not simply prepare "static" abstracts, but rather "quality" abstracts. As used herein, "static" abstracts are abstracts that include information gathered from candidate web pages (i.e., web pages related to the abstracts), without consideration to information about the candidate web sites gathered from other sources. These "static" abstracts would have been presented to the user using traditional search methods prior to the advent of the abstract update system 10. The "static" abstracts can be stored in the indexed data repository 175 or in any other suitable data store for later use by the search engine 17. "Quality" abstracts refer to abstracts that supplement the "static" abstracts, and that account for information gathered from sources other than the candidate web sites, as explained more fully in patent application Ser. No. 09/500, 633, is now abandoned titled "Using Annotative Link Information to Produce Quality Abstracts in Search Engines".

The query transformer 110, prompted by a user browser 200, applies an internal query request to the indexed data stored in the indexed data repository 175, and generates a preliminary search result with matches that are specific to the user's query. As it will be explained later in greater detail in connection with FIG. 4, when a user enters a search query, the indexing engine 100 does not automatically present abstracts based on the preliminary search result, but rather takes the additional step of inquiring if the link information stored in the link repository 170 contains new information for each result entry in the preliminary search result set. If new information exists, this information is fed to the abstract engine 140, which, in turn, generates a real time updated or dynamic abstract 190 for each of the qualifying result entries.

Once all the updated abstracts 190 are generated, the search result, including the updated abstracts 190 are transformed into viewable or browsable form (i.e., HTML) by the transformer 130. The transformed data is subsequently presented to the user at the user interface (UI) or browser 200.

Having described the main components of the abstract update system 10, its operation will now be explained in connection with FIGS. 2 through 4. The method of operation 300 of the abstract update system 10 of FIG. 2 is illustrated in the flowcharts of FIGS. 3 and 4.

Figure 3:
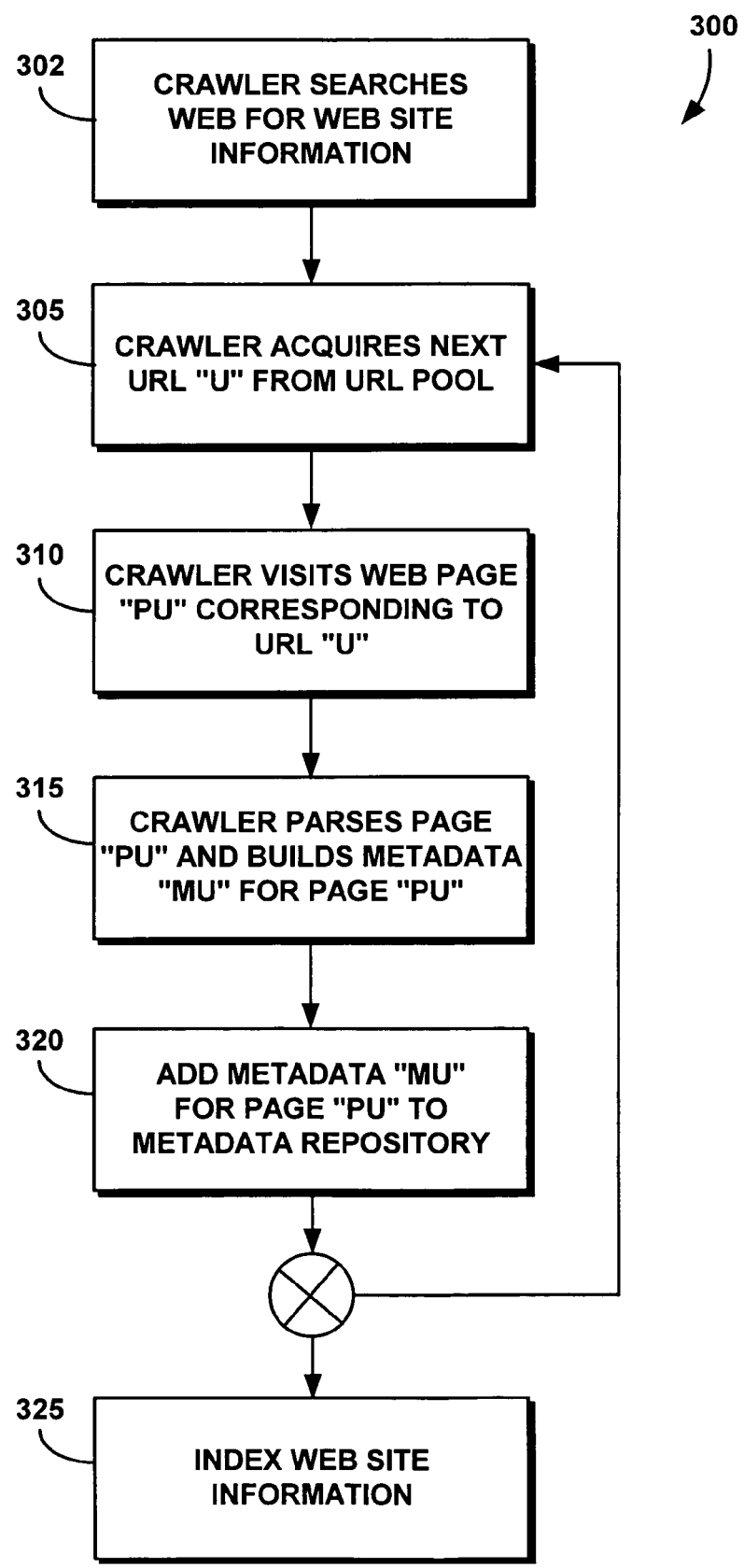
FIG. 3 is a flow chart depicting the operation of a web crawler that forms part of the abstract update system of FIG. 2.

FIG. 3 is a flow chart that depicts the method of operation 300 of the web crawler 150. At step 302 the crawler 150 searches the WWW and visits the web sites. While the crawler 150 is visiting a particular web page, it acquires the next URL "U" from a URL pool at step 305. As used herein, the URL pool contains the list of the URL pages referenced by visited pages, and can be stored in the link repository 170.

At step 310, the crawler 150 visits the web page "RU" at the URL "U". Thereafter, the crawler 150 parses the web page "PU" and starts building the metadata "MU" for the web page "PU". At step 320, the crawler 150 adds the metadata "MU" for the web page "PU" to the metadata repository 160, and repeats the routine comprised of the foregoing steps 305, 310, 315, and 320. At step 325 the indexing engine 100 indexes the content of the web documents or the information of the web documents, and stores the indexed data in the indexed data repository 175 or in another dedicated database. In addition, the indexing engine 100 indexes the link information contained in the crawled documents and stores them in the link repository 170.

Figure 4:
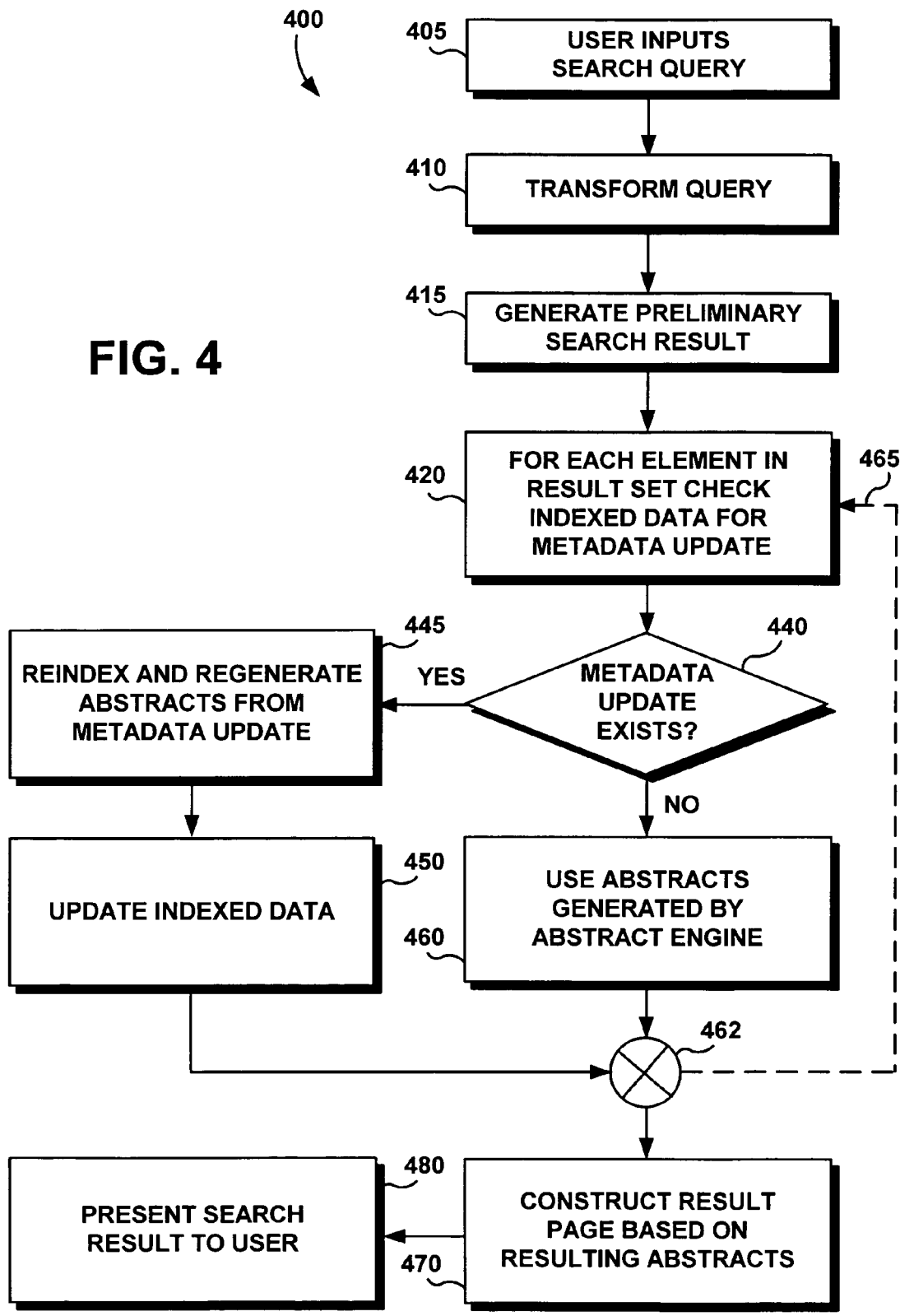
FIG. 4 is a flow chart depicting the operation of the abstract update system of FIG. 2.

FIG. 4 is a flow chart that depicts the method of operation 400 of the abstract update system 10 of FIG. 2. The user submits a query to the abstract update system 10 using the user interface 200 at step 405. The user query is transformed at step 410, by means of the query transformer 110, into a query request that is internal or proprietary to the search engine 17.

For a given query generated at step 410, and for a database of indexed data 175, the method 400 searches the indexed data for query matches. The step of matching the query against the indexed data is executed by the search engine 17. Discovering relevant matches is carried out by discovering instances where the user defined search words significantly overlap with those in the indexed data 175. At step 415 the search engine 17 refers the internal query request to the indexed data 175 and generates a preliminary search result that satisfies the user's query. The compilation of the indexed data is carried out in advance as depicted in FIG. 3.

Rather than presenting "static" or "quality" search abstracts that are based solely or primarily on the metadata stored in the indexed data repository 175, the abstract update system 10 aims at providing the user with updated or dynamic abstracts 190. To this end, and for each element or abstract in the result set, the search engine 17 checks the link repository 170 at step 420, and inquires at decision step 440 if the link repository 170 contains link information related to the search element's URL, which is newer or more recent than the indexed data in the indexed data repository 175.

The determination at steps 420 and 440 of whether newer metadata exists is based primarily on two factors. The first factor includes changes or revisions to the candidate web page itself, and the second factor includes changes or revisions to what other sources provide about this candidate web page. For example, the candidate web page, also referred to as candidate page, may not have changed, but new pages may point to it; some pages that used to point to the candidate page no longer do so; or existing pages that point to the candidate page change their annotations.

If it is determined at step 440 that newer metadata or information exists, such metadata is fed to the indexing engine 100. In turn, the indexing engine 100 uses the newer metadata or (metadata update) to reindex and to generate real time, updated, dynamic abstracts 190 for the result entry (step 450). The dynamic abstracts 190 will contain more up to date information than the conventional "static" abstracts or the "quality" abstracts. The indexing engine 100 then updates its information at step 450 about the search elements' URLs to include the newer metadata in the "dynamic" abstracts.

In the event it is determined at step 440 that no newer metadata exists, the abstract update system 10 presents to the user, the "static" or "quality" abstracts 180 that have been previously generated by the abstract engine 140.

At junction point 462 the method 400 loops back to step 420, as indicated by the dashed line 465, and repeats the intermediate steps 440, 445, 450, and 460 until all the elements in the result set have been checked and/or updated. Wherefrom, the method 400 proceeds to step 470 where the transformer 130 constructs the result page based upon the resulting abstracts revealed by the search engine 17, which include the "dynamic" abstracts 190, as described earlier. The user interface 200 then displays the result page to the user at step 480.

It is to be understood that the specific embodiments of the invention that have been described are merely illustrative of certain application of the principle of the present invention. Numerous modifications may be made to the abstract update system and associated method described herein without departing from the spirit and scope of the present invention.

Moreover, while the present invention is described for illustration purpose only in relation to the WWW, it should be clear that the invention is applicable as well to databases and other tables with indexed entries.

What is claimed is:

1. A system for automatically generating dynamic search abstracts, comprising:
   a crawler for crawling documents and acquiring metadata and link information from the documents;
   a metadata repository for storing the metadata acquired by the crawler;
   a link repository for storing link information acquired by the crawler;
   an abstract engine for generating abstracts of the documents from the metadata;
   an indexing engine for periodically indexing the metadata and the link information;
   a search engine for applying a search query to the metadata indexed by the indexing engine, to generate a preliminary result set containing selected abstracts; and
   wherein the search engine inquires if the link repository contains new link information about the preliminary result set, and updates the selected abstracts based on the new link information, if any, to generate the dynamic search abstracts.

2. The system according to claim 1, further including a query transformer, which, when prompted by the search query, applies a query request to the metadata and the link information indexed by the indexing engine.

3. The system according to claim 1, further including a search results transformer that transforms the dynamic search abstracts into a user browsable form.

4. The system according to claim 1, wherein the link repository stores persistent link information and maintains a crawl history.

5. The system according to claim 1, wherein at least one of the selected abstracts includes information gathered from a source other than a candidate page associated with the selected abstract.

6. A computer program product for automatically generating dynamic search abstracts, comprising:
   a crawler for crawling documents and acquiring metadata and link information from the documents;
   a metadata repository for storing the metadata acquired by the crawler;
   a link repository for storing link information acquired by the crawler;
   an abstract engine for generating abstracts of the documents from the metadata;
   an indexing engine for periodically indexing the metadata and the link information;
   a search engine for applying a search query to the metadata indexed by the indexing engine, to generate a preliminary result set containing selected abstracts; and
   wherein the search engine inquires if the link repository contains new link information about the preliminary result set, and updates the selected abstracts based on the new link information, if any, to generate the dynamic search abstracts.

7. The computer program product according to claim 6, further including a query transformer, which, when prompted by the search query, applies a query request to the metadata and the link information indexed by the indexing engine.

8. The computer program product according to claim 6, further including a search results transformer that transforms the dynamic search abstracts into a user browsable form.

9. The computer program product according to claim 6, wherein the link repository stores persistent link information and maintains a crawl history.

10. The computer program product according to claim 6, wherein at least one of the selected abstracts includes information gathered from a source other than a candidate page associated with the selected abstract.

11. A method for automatically generating dynamic search abstracts, comprising:
- crawling documents and acquiring metadata and link information from the documents;
- storing the metadata acquired by the crawler in a metadata repository;
- storing link information acquired by the crawler in a link repository;
- generating abstracts of the documents from the metadata;
- periodically indexing the metadata and the link information;
- applying a search query to the metadata to generate a preliminary result set containing selected abstracts; and
- inquiring if the link repository contains new link information about the preliminary result set, and updating the selected abstracts based on the new link information, if any, to generate the dynamic search abstracts.

12. The method according to claim 11, wherein updating a selected abstract includes gathering information from a source other than a candidate site associated with the selected abstract.

13. The method according to claim 11, wherein if the link repository does not contain new link information, presenting abstracts previously stored in the link repository.

14. The method according to claim 11, further including applying a query request to the metadata and the link information indexed by the indexing engine.

15. The method according to claim 11, further including transforming the dynamic search abstracts into a user browsable form.

16. The method according to claim 11, further including storing persistent link information and maintaining a crawl history in the link repository.

17. A computer program product having instruction codes for automatically generating dynamic search abstracts, comprising:
- a first set of instruction codes that acquire documents and metadata and link information from the documents;
- a metadata repository that store the metadata;
- a link repository that store the link information;
- a second set of instruction codes that generate abstracts of the documents from the metadata;
- a third set of instruction codes that periodically index the metadata and the link information;
- a fourth set of instruction codes that apply a search query to the metadata, to generate a preliminary result set containing selected abstracts; and
- a fifth set of instruction codes that inquire if the link repository contains new link information about the preliminary result set, and that update the selected abstracts based on the new link information, if any, to generate the dynamic search abstracts.

18. The computer program product according to claim 17, wherein updating a selected abstract includes gathering information from a source other than a candidate site associated with the selected abstract.

19. The computer program product according to claim 17, wherein if the link repository does not contain new link information, presenting abstracts previously stored in the link repository.

20. The computer program product according to claim 17, further including applying a query request to the metadata and the link information indexed by the indexing engine.

21. The computer program product according to claim 17, further including transforming the dynamic search abstracts into a user browsable form.

22. The computer program product according to claim 17, further including storing persistent link information and maintaining a crawl history in the link repository.

\* \* \* \* \*